United States Patent
Montanaro et al.

(10) Patent No.: US 8,606,093 B2
(45) Date of Patent: Dec. 10, 2013

(54) WATER HEATER OR STEAM GENERATOR

(75) Inventors: Mario Montanaro, Thun (CH); David Naman, Thun (CH); Gustavo Beltrami, Vogogna (IT)

(73) Assignee: LASAG AG, Thun (CH)

( * ) Notice: Subject to any disclaimer, the term of this patent is extended or adjusted under 35 U.S.C. 154(b) by 0 days.

(21) Appl. No.: 13/420,264

(22) Filed: Mar. 14, 2012

(65) Prior Publication Data

US 2012/0180316 A1    Jul. 19, 2012

Related U.S. Application Data

(62) Division of application No. 11/571,627, filed as application No. PCT/EP2005/007189 on Jul. 4, 2005, now abandoned.

(30) Foreign Application Priority Data

Jul. 5, 2004 (EP) .................................... 04015748

(51) Int. Cl.
*F24H 1/18* (2006.01)
*F24H 1/20* (2006.01)

(52) U.S. Cl.
USPC ..................... 392/441; 219/121.64; 392/455

(58) Field of Classification Search
None
See application file for complete search history.

(56) References Cited

U.S. PATENT DOCUMENTS

| | | | |
|---|---|---|---|
| 3,135,860 A | 6/1964 | Czarnecki | |
| 3,657,519 A | 4/1972 | Pease | |
| 3,778,592 A | 12/1973 | Williams | |
| 4,241,291 A | 12/1980 | Carnes | |
| 4,321,744 A | 3/1982 | Carnes | |
| 4,680,446 A | 7/1987 | Post | |
| 5,099,825 A | 3/1992 | Massey et al. | |
| 5,379,365 A | 1/1995 | Lesage | |
| 5,574,822 A | 11/1996 | West | |
| 6,516,141 B1 | 2/2003 | DeSantis et al. | |
| 7,277,627 B2 | 10/2007 | Hughes et al. | |

FOREIGN PATENT DOCUMENTS

| | | |
|---|---|---|
| CA | 1 129 278 | 8/1982 |
| CA | 1 237 483 | 5/1988 |
| CA | 2 200 353 | 5/1996 |
| CA | 2 209 369 | 4/2000 |
| CA | 2 465 201 A1 | 5/2003 |
| DE | 93 19 046.8 | 2/1994 |
| DE | 92 17 395.0 | 4/1994 |

(Continued)

OTHER PUBLICATIONS

Office Action issued in co-pending Canadian application 2,573,019 on Feb. 21, 2011.

(Continued)

*Primary Examiner* — Thor Campbell
(74) *Attorney, Agent, or Firm* — Griffin & Szipl, P.C.

(57) ABSTRACT

The water heater (2) or steam generator comprises a chamber (4) in two sections (5, 6) formed in particular by stamping. Inside this chamber a heating element (8) is arranged, which has a spiral-shaped main section (10) and two end sections (11, 12) passing through two circular openings of the chamber. The two end sections are welded to the chamber by a laser beam such that the weld obtained is continuous and ensures a good mechanical fixture of the heating element and an adequate tightness for the water heater or steam generator. For this purpose, a flange (18) is arranged at the periphery of each opening. Moreover, the two sections of the chamber have a widened edge (28) to allow them to be welded effectively.

9 Claims, 12 Drawing Sheets

(56) References Cited

FOREIGN PATENT DOCUMENTS

| | | |
|---|---|---|
| DE | 195 38 159 A1 | 4/1997 |
| DE | 197 41 093 A1 | 3/1999 |
| EP | 0 622 150 A1 | 11/1994 |
| GB | 2 290 601 A | 1/1996 |
| JP | 49-127844 | 11/1974 |
| JP | 59-101290 A | 6/1984 |
| JP | 61-33361 | 9/1986 |
| JP | 10-202380 A | 8/1998 |
| WO | 03/039804 A1 | 5/2003 |

OTHER PUBLICATIONS

European Search Report issued in corresponding application No. EP 04 01 5748, completed Dec. 1, 2004.
International Search Report issued in corresponding application No. PCT/EP2005/007189, completed Oct. 11, 2005 and mailed Oct. 19, 2005.
Office Action issued in corresponding Canadian patent application 2,573,019 on Jan. 11, 2012.
Letter dated Oct. 18, 2012 reporting Notification of Provisional Rejection in counterpart Korean application 10-2007-7000111 issued on Sep. 27, 2012.

WATER HEATER OR STEAM GENERATOR

This application is a divisional application of U.S. patent application Ser. No. 11/571,627, filed Nov. 30, 2007, which is a National Phase Application in the United States of International Patent Application No. PCT/EP2005/007189 filed Jul. 4, 2005, which claims priority on European Patent Application No. 04015748.9, filed Jul. 5, 2004. The entire disclosures of the above patent applications are hereby incorporated by reference.

FIELD OF THE INVENTION

The invention relates to a water heater or a steam generator comprising a chamber to receive a liquid to be heated or/and evaporated and a heating element. More specifically, the invention relates to those devices, at which the heating element enters the interior of the chamber to directly heat the liquid that it contains.

In particular the present invention relates to a water heater or a steam generator for installation in a coffee machine. It should be understood that the invention applies to all similar devices for the production of hot water or the generation of steam, in particular for rapidly heating milk.

The present invention is applicable to water heaters fitted into devices of larger volume, in particular washing machines or dishwashers.

It is noted here that the term water heater should be understood to mean a device arranged for heating a liquid, in particular water, but also other liquids.

BACKGROUND OF THE INVENTION

Prior Art

Water heaters and steam generators are known for installation in coffee machines that are formed by a solid chamber produced by casting a metal, in particular aluminum. On the outside, the chamber has recesses for passage of a heating element arranged outside the chamber, into which the liquid to be heated is introduced. The two main sections forming the chamber are fastened to one another by several screws and the elements for introduction and/or discharge of the liquid are screwed tightly to the solid case, which at least at these locations has a relatively thick wall to allow machining of a thread that is sufficiently deep to hold these elements. Such water heaters or steam generators are particularly costly to produce. The supply of heat to the liquid is achieved through the solid wall of the chamber and this generates a certain inertia in the transfer of heat from the heating element to the liquid to be heated or evaporated and also relatively significant heat losses.

Water heaters that have a heating element inserted into the chamber containing the liquid to be heated are also known, in particular from patent document GB 2 290 601. This document instructs insertion of the heating element into the chamber through an opening in an upper plane wall of the chamber. The heating element can be fastened to this upper wall by welding or soldering. Patent document DE 197 41 093 proposes a closing plate of a water heater through which the heating element welded to this plate also passes. The opening in the plate for the heating element to pass through consists of a single perforation of the plane plate. This patent document mentions that a tight weld can be obtained in particular by laser welding.

The object of the present invention is to propose a water heater or steam generator that has a low cost of production but is also reliable, in particular with respect to the tightness of the chamber for heating the liquid.

To reduce the cost of production, it is proposed, for example, to form the chamber by stamping thin metal plates. In particular in the case of a flat and thin cover, such as disclosed in the two aforementioned documents, it is difficult to ensure a tight fastening of the heating element to this cover by laser welding when the provided passage is a single hole in this flat cover. In fact, machining tolerances generally result in a slot between the cylindrical heating element and the circular hole provided in the wall of the heating chamber. Therefore, for welding the heating element by means of a laser beam there is little material to fuse in order to firmly fill the above-mentioned slot, since the plate has a low thickness. Therefore, there is the risk of the welding zone becoming brittle and of tightness not being assured in this zone either during production of the water heater or steam generator or after a certain period of use.

It should be noted that the heating element can withstand various mechanical or thermal stresses. In the aforementioned prior art, the heating element is perpendicular to the flat cover and is therefore only held over a very short distance that corresponds approximately to the thickness of the cover when the welding is performed by a laser beam. Therefore, it is understood that the fastening is relatively fragile in such a case.

Therefore, the object of the invention is to remedy the problems of the aforementioned prior art.

BRIEF SUMMARY OF THE INVENTION

The invention firstly relates to a water heater or steam generator comprising a chamber and a heating element with a main section located inside the chamber and at least one end section exiting from this chamber, the end section passing through the chamber through an opening provided in a wall of this chamber, characterised in that a flange is arranged around the periphery of the opening and protrudes out of the main surface of the wall of the chamber in the direction of the end section in the opening.

It is noted that the welding performed by means of a laser beam allows a clean weld to be obtained with a heat supply that is controlled so as not to damage the heating element, in particular to prevent a short-circuit between the outer tube and the inner electrical conductor forming this heating element.

Because of the features of the invention, the heating element can be fastened to the chamber by laser welding in an effective and reproducible manner ensuring a good tightness at the weld and a rigid fixture. The flange serves as guide for the end section of the heating element. It thus ensures a correct lateral hold and supplies the material necessary for the formation of a continuous weld without making the wall of the chamber brittle or thinner to fill any possible slot between the end section and the flange.

Thus, this flange can be thin while also assuring the quantity of the laser welding. Moreover, it prevents the chamber from deforming at the periphery of the opening and restricts the thermal stresses transferred to the peripheral zone of the chamber by reducing the quantity of energy to be supplied to achieve the welding.

The invention also relates to a water heater or steam generator comprising a chamber formed by at least two sections and characterised in that these two sections are welded by a laser beam, and that at least one of these two sections has an edge forming a projection protruding out of the main surface of the chamber, the welding of the two sections being performed at the level of this projecting edge.

Some advantages mentioned with respect to the first subject of the invention, i.e. the provision of a flange defining the opening for an end section of a heating element to pass through, also apply to the second subject of the invention mentioned above, in particular with respect to the reservoir of material for producing a good quality continuous weld assuring a favorable tightness of the chamber without making it brittle or requiring its thickness to be increased in the welding zone.

It is evident that the present invention can be used advantageously in numerous other applications where conduits are assembled to a chamber, in particular when this chamber has to withstand an increase in temperature and/or pressure and also when tightness must be assured, in particular under these conditions. The conduits can be rigid or flexible. In particular, they can serve to conduct an electric current or supply an electric voltage, to heat or cool the contents of a chamber, to form a channel for the passage of particles or molecules in the direction of the chamber or outside this chamber, for example, in the field of vacuum technology.

Thus, in accordance with a first non-limiting illustrative embodiment of the present invention, a water heater (2) or steam generator (52) is provided, which includes a chamber (4) and a heating element (8) with a main section (10; 58) located inside the chamber and at least one end section (11, 12) exiting from this chamber, wherein the end section passes through the chamber through an opening (13, 14) provided in a wall (16; 55) of this chamber, characterised in that a flange (18; 18A; 18D; 18G) is arranged at the periphery of the opening and protrudes out of the main surface of the wall of the chamber in the axial direction (25) of the end section at the level of this opening, wherein the heating element is tightly secured to the chamber by laser welding performed at the level of the flange. In accordance with a second non-limiting illustrative embodiment of the present invention, the first non-limiting embodiment is modified so that the flange is formed in one piece with the wall of the chamber. In accordance with a third non-limiting illustrative embodiment of the present invention, the second non-limiting embodiment is modified so that the flange (18; 18D) has a shape widening towards the interior of the chamber.

In accordance with a fourth non-limiting illustrative embodiment of the present invention, the first, second, and third non-limiting embodiments are further modified so that the flange (18A; 18G) has a section (18B) having a wall parallel to the axial direction of the end section and defining a guide for this end section. In accordance with a fifth non-limiting illustrative embodiment of the present invention, the first, second, third, and fourth non-limiting embodiments are further modified so that the flange (18G) is formed in such a way that it has a certain degree of elasticity and/or deformability to allow some variation in the axial direction of the end section at the level of this flange. In accordance with a sixth non-limiting illustrative embodiment of the present invention, the first, second, third, fourth and fifth non-limiting embodiments are further modified so that the chamber (4) is formed by a metal, wherein the at least one end section of the heating element is formed by an electrical conductor (20) surrounded at some distance by an outside metal wall (22). In accordance with a seventh non-limiting illustrative embodiment of the present invention, the third non-limiting embodiment is modified so that the metal is stainless steel. In accordance with an eighth non-limiting illustrative embodiment of the present invention, the first, second, third, fourth, fifth, sixth and seventh non-limiting embodiments are further modified so that they also comprise connector fittings (30, 31) or elements associated with means for introducing liquid into the chamber or with discharge elements for the heated liquid or steam, characterised in that these connector fittings or elements are also secured to the chamber by laser welding. In accordance with a ninth non-limiting illustrative embodiment of the present invention, the first and second non-limiting embodiments are further modified so that the body of the chamber has a relatively thin wall formed by two stamped metal sections also assembled by laser welding.

In accordance with a tenth non-limiting illustrative embodiment of the present invention, a water heater (2) or steam generator (52) is provided, which includes a chamber (4) formed by at least two sections (5, 6; 55, 56), characterised in that these two sections are welded by a laser beam and that at least one of these two sections has an edge (28) forming a projection protruding out of the main surface of the chamber, wherein welding of the two sections is performed at the level of this projecting edge. In accordance with an eleventh non-limiting illustrative embodiment of the present invention, the first, second, third, fourth, fifth, sixth, seventh, eighth, ninth, and tenth non-limiting embodiments are further modified so that the laser welding is performed with a series of pulses each having a power profile with a power over a first period (P1), which is essentially higher than the power over a second period (P2) following the first period. In accordance with a twelfth non-limiting illustrative embodiment of the present invention, the eleventh embodiment is further modified so that the power during the second period is descending overall.

BRIEF DESCRIPTION OF THE FIGURES

The present invention shall be described in more detail on the basis of the attached drawing that is given by way of non-restrictive example, wherein.

DETAILED DESCRIPTION OF THE INVENTION

Figure 1:
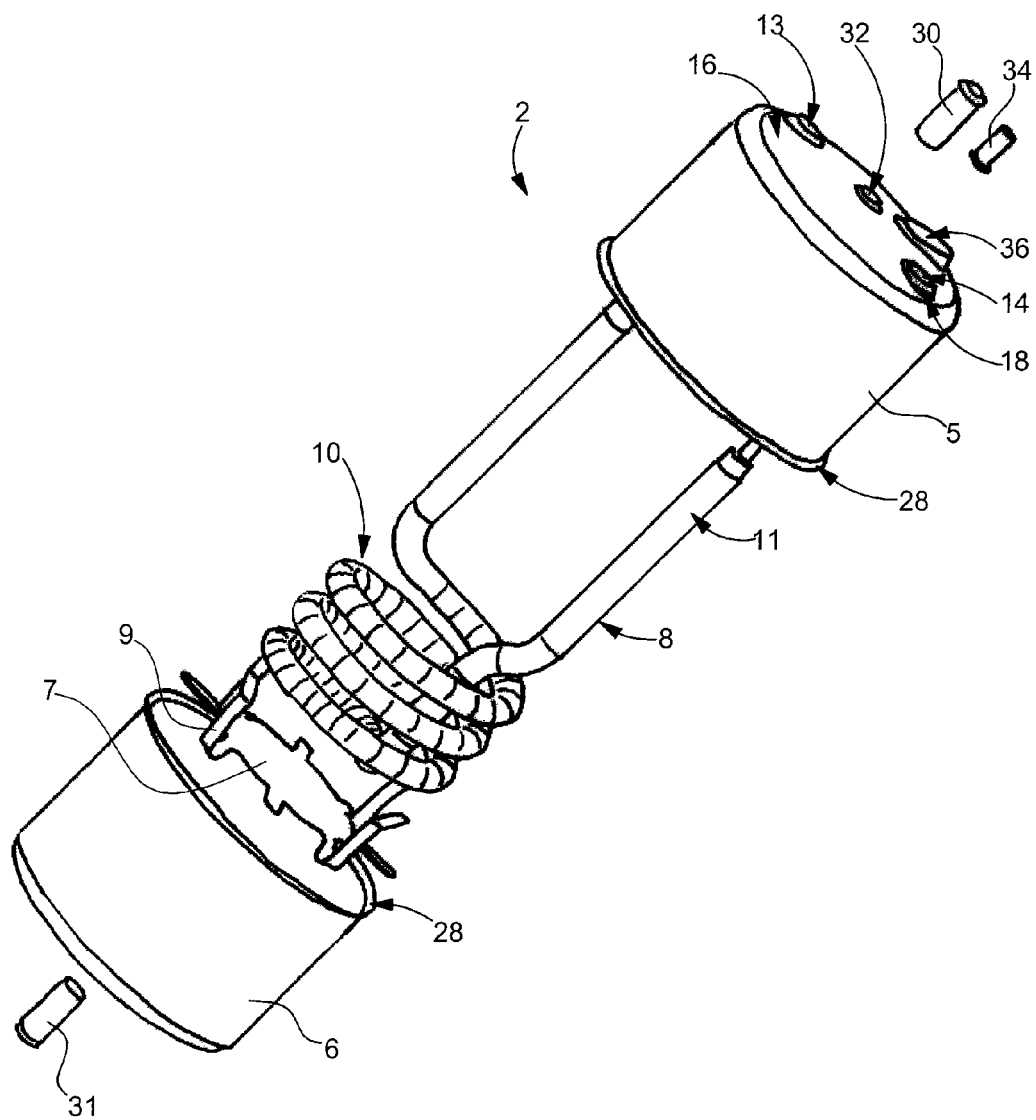
FIG. 1 is an exploded perspective view of a water heater according to the invention.

A water heater according to the present invention shall be described below on the basis of FIGS. 1 to 3. This water heater 2 comprises a chamber 4 formed by two sections 5 and 6. It additionally comprises a heating element 8 having a spiral-shaped main section 10 provided inside the chamber 4 and two end sections 11 and 12 exiting from the chamber. The two end sections 11 and 12 are cylindrical and essentially rectilinear. On its end face 16 the upper section 5 of the chamber has two circular openings 13 and 14. The diameter of these openings essentially corresponds to the diameter of the end sections 11 and 12 of the heating element. These end sections 11 and 12 are inserted from the interior of section 5 into corresponding openings 13 and 14. These end sections pass through the wall of the chamber 4 in this way. The end wall 16 is slightly curved and two flanges 18 define the openings 13 and 14 respectively. According to the invention each flange protrudes out of the main surface of this end wall in the axial direction of the corresponding end section in the opening of this flange. The flanges 18 are shaped so that the edge of each opening is located essentially in a geometric plane perpendicular to the longitudinal axis 19 of the water heater 2. The edge of each flange 18 thus defines a circle.

Figure 10:
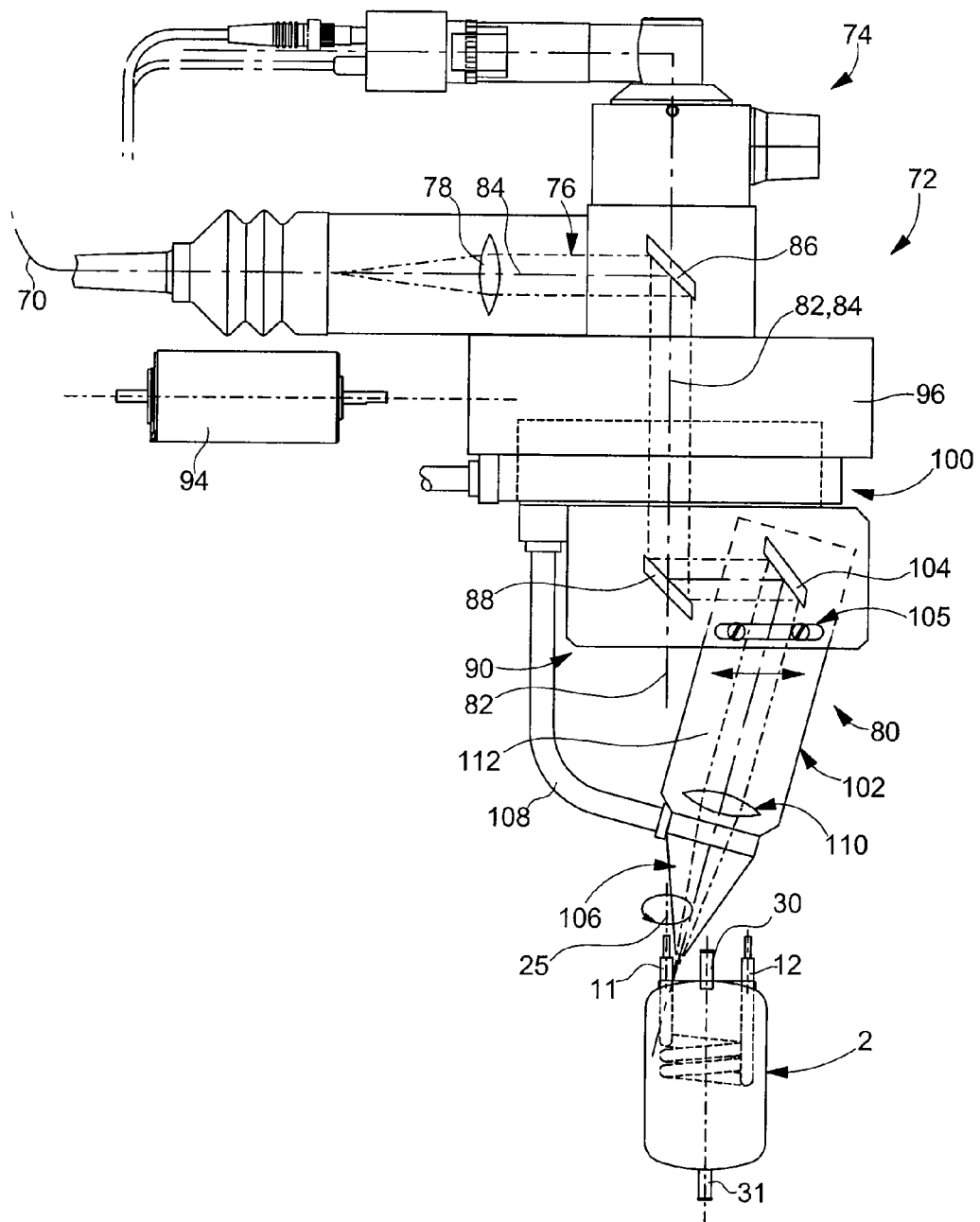
FIG. 10 partially shows a laser welding assembly for performing welding operations according to the invention.
Figure 11:
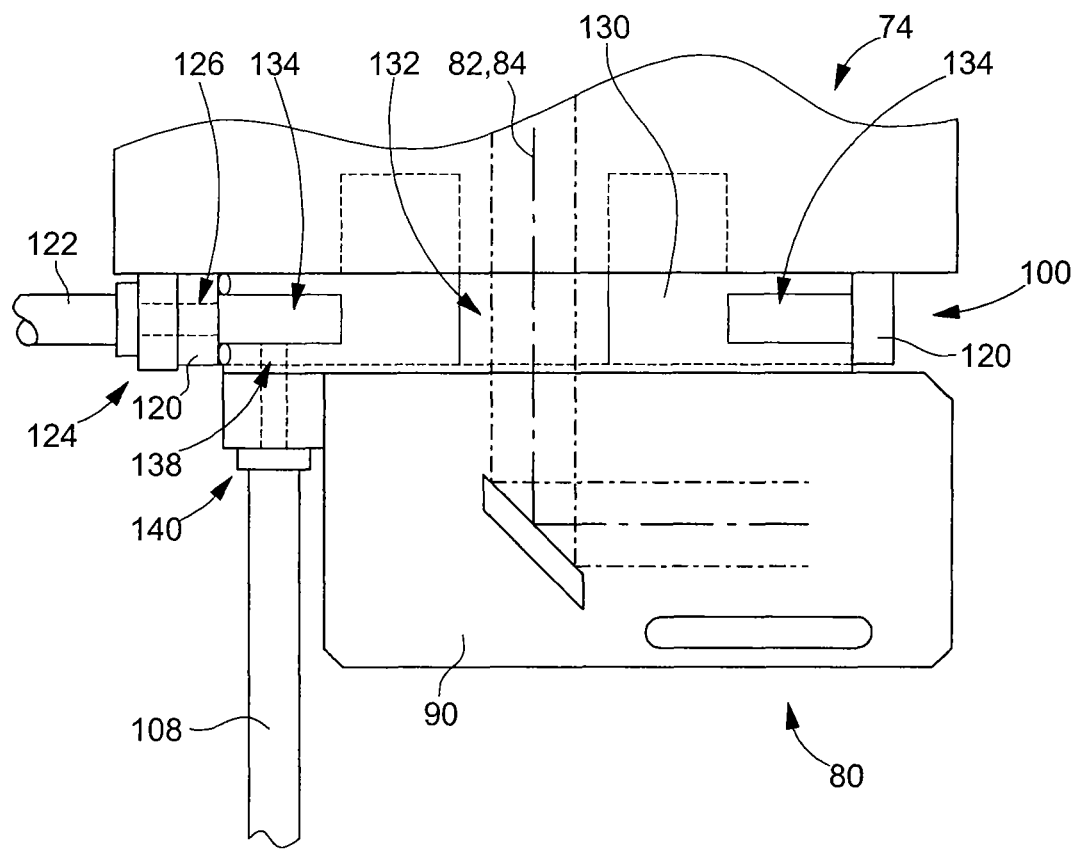
FIG. 11 shows a section of the assembly of FIG. 10 fitted for the supply of a work gas to the rotary welding head.

During production of the water heater, it is provided that the two end sections 11 and 12 are inserted into the two respective openings 13 and 14 so that the main section 10 is located inside the chamber 4 after its closure. The heating element 8 is fastened to the section 5 of the chamber 4 by welding by a laser beam the two end sections 11 and 12 to the chamber 4 at the two openings 13 and 14. This laser welding is performed to assure tightness at the openings 13 and 14. The heating element 8 is positioned in relation to section 5 by positioning means that ensure centering of the heating element in the chamber. A positioning tool provided for this purpose is shown in FIGS. 10 and 11.

It is in fact important when welding the heating element to the chamber that this is centered in relation to this chamber to prevent it from being too close to the wall thereof. In a preferred mode of production, it is provided to weld the heating element to the upper section 5 of the chamber before providing the lower section 6 and closing the chamber by assembling these two sections. To perform the welding of the heating element, it is provided to use the tool 170 shown in FIGS. 10 and 11. It should be noted here that correct and stable positioning of the heating element in relation to the upper section 5 in order to achieve a precise weld is problematic as a result of the spiral shape of the heating element and of the fact that its diameter varies from one piece to the other. The production tolerance for such pieces is generally greater than ±1 mm, in particular ±1.5 mm.

The tool 170 developed within the framework of the invention is formed from a base 172 arranged to be fastened to the laser welding assembly. Clamping jaws 174, 176 and 178 are arranged essentially concentrically and to be radially movable on this base. Also mounted on the base is an upper section 180 that defines a seating for the clamping jaws and a channel 182 above these for insertion of the heating element. A recess 186 is provided in the outside side wall 184 of each jaw for a spring 188, which abuts against the inside wall 190 of section 180. It is evident that the recesses 186 are out of line in relation to the jaws. Moreover, recesses 194 are also provided in the inside wall 190 for springs 196 coming into abutment against the side walls 184. In an advantageous variant it is provided that the force exerted by each spring 196 is less than that exerted by each spring 188, or vice versa.

On their upper section the jaws have a sloping surface 200 to guide the spiral of the heating element when it is inserted between the jaws. The diameter between the jaws is initially provided to be slightly smaller than the minimum diameter of the spiral. Thus, during its insertion the heating element spreads the jaws, which then clamp it to assure proper centering. The upper section 5 of the chamber 4 is placed on section 180 with the wall 202 of the channel 182 forming a guide so that the end sections 11 and 12 of the heating element are positioned correctly in relation to the openings 13 and 14 of the chamber. The wall 202 positions the section 5 of the chamber during the laser welding.

Figure 4A:
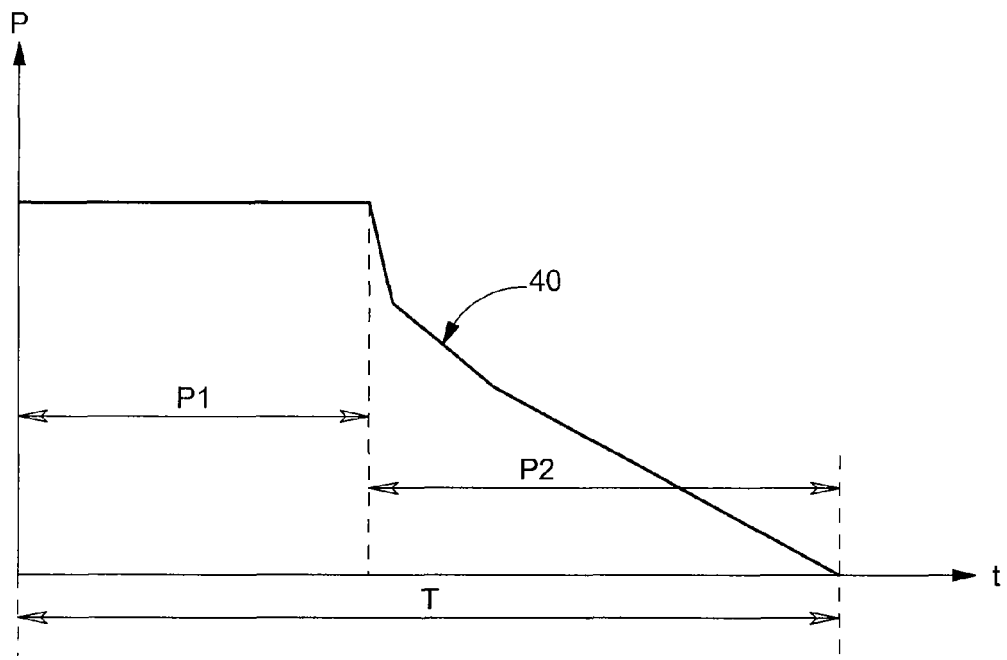
FIGS. 4A and 4B each show a power profile of the pulses of the laser beam used to perform the welding of FIG. 3.
Figure 4B:
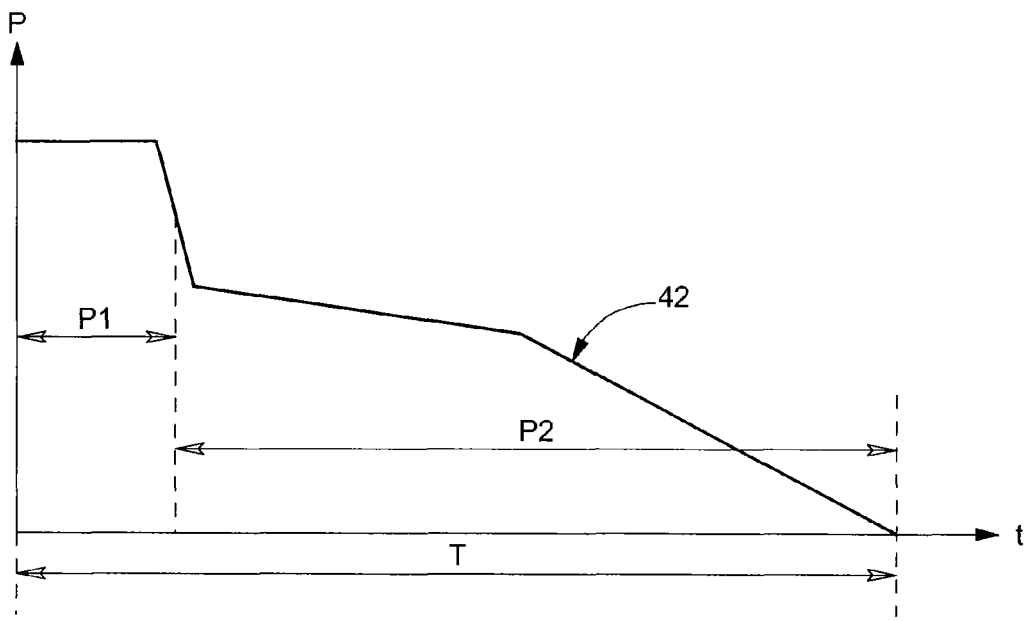

The end sections 11 and 12 are formed by a central conductor 20 surrounded by an outside metal wall 22, this latter being arranged at some distance from the conductor 20. A ceramic insulating part 24 is arranged at the end of the tube 22. This insulating part 24 can be reasonably long and extend in particular as far as the opening 13, 14. The edge of the flange 18 is therefore welded to the outside wall 22 by a laser beam. The weld thus defines a circle centered on the geometric axis 25 of the cylindrical tube 22. The welding is preferably achieved by means of a pulsed laser beam, which generates a series of weld points that are partially superposed on one another. Thus, a continuous and tight weld is achieved around the entire circle defined by the edge of the flange 18. As shall be described below, the laser beam performs a rotation around the axis 25 to achieve a circular weld 26. A preferred form of laser pulses used for the welding described here is shown in FIGS. 4A and 4B. These FIGS. 4A and 4B schematically show two power curves 40 and 42 each forming pulses supplied by the laser assembly. The profile of these laser pulses is characterised by a first period P1, in which the instantaneous power is essentially higher than the instantaneous power of a second period P2 following the first period P1. Moreover, the power in the second period P2 has an overall descending curve.

By way of example, in particular for a chamber and an outside wall of the water heater made of stainless steel, the frequency of the laser pulses is envisaged to be between 30 and 100 Hz, the power in the first period P1 being between 1 and 2 kW. The duration of the pulses T lies between about 4 and 10 milliseconds. Advantageously, the energy of each pulse has a value of about 3 to 8 Joules while the average power lies between 150 and 500 W. Conclusive tests have been conducted under these conditions at a displacement speed of the laser beam of between 400 and 1000 mm per minute.

The power profile of the pulses has been selected so as to reduce the energy necessary for welding while assuring a very favorable mechanical fixture and the tightness required for a water heater or steam generator. Moreover, the form of the pulses allows improvement of the optical quality of the weld 26 and reduction of the thermal stresses through a longer cooling period resulting from the power profile of the second pulse period P2.

The sections 5 and 6 of the chamber 4 are formed by stamping and have a relatively thin wall. Laser welding does not require thick walls. Therefore, the chamber 4 can be produced in particular by stamping at a low cost. To position the spiral of the heating element in the chamber and hold it securely in its centered position, a structure 7 is provided in the base of the lower section 6 of the chamber that has elastic lugs 9, against which the spiral 10 abuts when the chamber is closed.

The water heater 2 also includes connector fittings or elements 30 and 31 associated with the circulation circuit of the liquid to be heated. These fittings 30 and 31 are respectively positioned in two openings 32 and welded to be tight by a laser beam. As in the case of the welding of the heating element, the weld is circular and continuous. The process of welding these fittings is similar to that described above for welding the heating element to the chamber. Moreover, the water heater comprises an earthing terminal 34 that is also welded by laser beam to a contact area 36 of the chamber. Therefore, all the elements assembled to the chamber 4 are preferably fixed in place by laser welding. This allows the production of water heaters to be rationalised and the production time and the cost of such water heaters to be reduced. It should be noted that a temperature sensor can also be fastened to the chamber 4 by laser welding. However, other means for fastening such a sensor are conceivable.

Finally, after welding of the heating element 8 to the metal section 5 the sections 5 and 6 are also assembled by laser welding. To ensure that the thin walls of the chamber 4 are firmly welded, on the side of their open ends sections 5 and 6 have a widened end section 28 extending from the cylindrical surface defined by the side wall of section 5 and 6 respectively of the chamber 4.

The widened sections of the two parts 5 and 6 are applied one against the other to define a projecting section of the chamber. This projecting section defines a reservoir of material to produce a thick and tight weld despite the wall of the chamber being thin. The welding is advantageously performed at the apex of the two widened sections that join, but can also be performed between the two widened sections by welding across one widened section, in particular when the widened section is at least partially oriented perpendicularly to the main surface of the chamber.

It shall be noted that the heating element can have a single end section passing through the wall of the chamber provided for the liquid to be heated.

Figure 5:
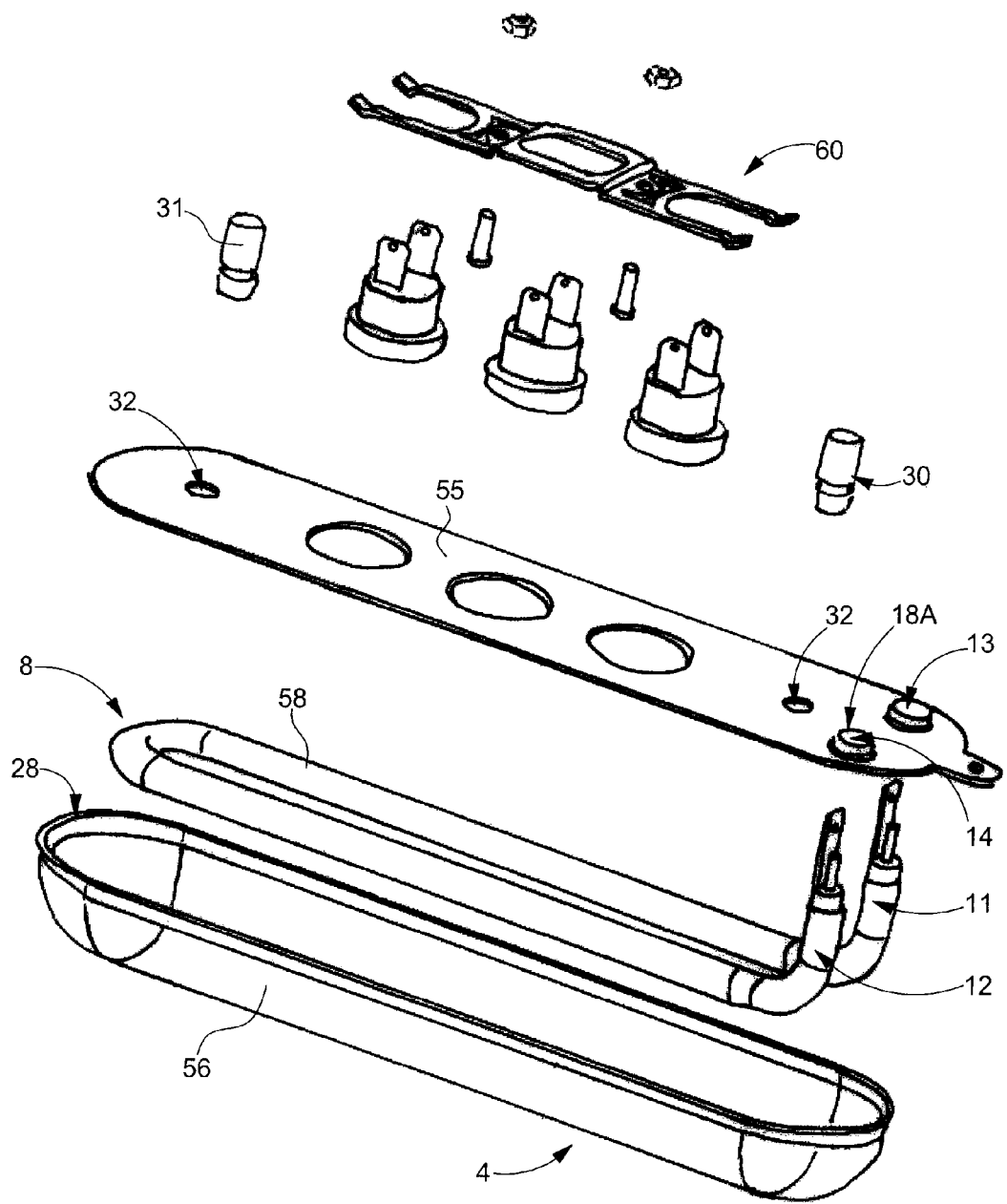
FIG. 5 is an exploded perspective view of a steam generator according to the invention.
Figure 6:
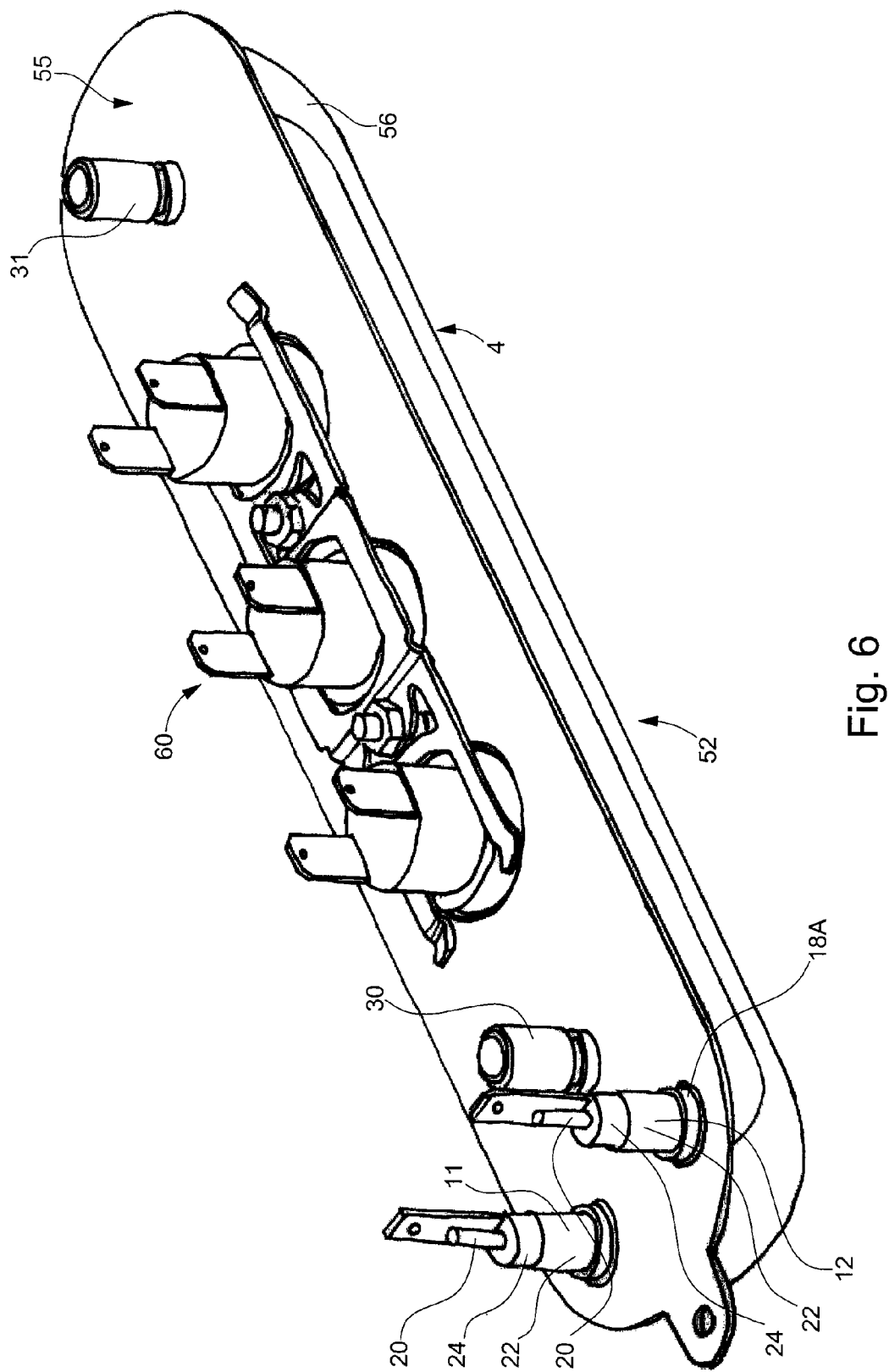
FIG. 6 is a perspective view of the steam generator of FIG. 5 after closure of the chamber.

FIGS. 5 and 6 show a steam generator according to the present invention. The references already described above will not be described here again in detail.

The steam generator 52 comprises a chamber 4 formed from a first upper section 55 and a second lower section 56. These two sections are made of stamped metal, in particular stainless steel. On its upper edge section 56 is slightly widened to form a projection 28 in a similar manner to section 6 of the chamber of the water heater of FIG. 1. The steam generator also has a heating element 8 formed by a main section 58 and two end sections 11 and 12 that define two cylindrical sections passing through circular openings 13 and 14 provided in the upper section 55. In a similar manner to that described for the water heater, the end sections 11 and 12 are welded to the chamber 4 at the level of holes 13 and 14 defined by cylindrical flanges 18A. This welding is conducted to assure tightness by a laser beam oriented so as to form a weld at the junction between the edge of hole 13 and 14 respectively and the metal wall 22 of the end section 11 and 12 respectively. The weld is preferably formed by a series of weld points that are partially superposed one on top of the following. This enables a continuous weld to be obtained that assures tightness even when the pressure increases in the chamber 4.

A fitting 30 for the introduction of water and a fitting 31 for discharge of the steam produced are also welded to the upper section 55 at the level of the edge of the two respective holes 32. Finally, a temperature measurement module 60 comprising three temperature sensors is mounted to the upper section 55.

The chamber 4 and the outer tube 22 forming the heating element 8 are advantageously made from stainless steel. However, other metals can be envisaged by a person skilled in the art. Advantageously, the two sections 55 and 56 of the chamber 4 are also fastened to one another by laser welding. Although the wall of the chamber 4 is relatively thin, laser welding allows a very solid assembly of the various sections in particular as a result of the flange 18A and the widened section 28 forming the edge of section 56 of the chamber. Moreover, laser welding allows a favorable tightness and favorable resistance to mechanical stresses to be assured, in particular upon an increase in the pressure of the chamber. The cost of material for forming a chamber is reduced to a minimum and the overall cost of production of the steam generator is relatively low.

Figure 7:
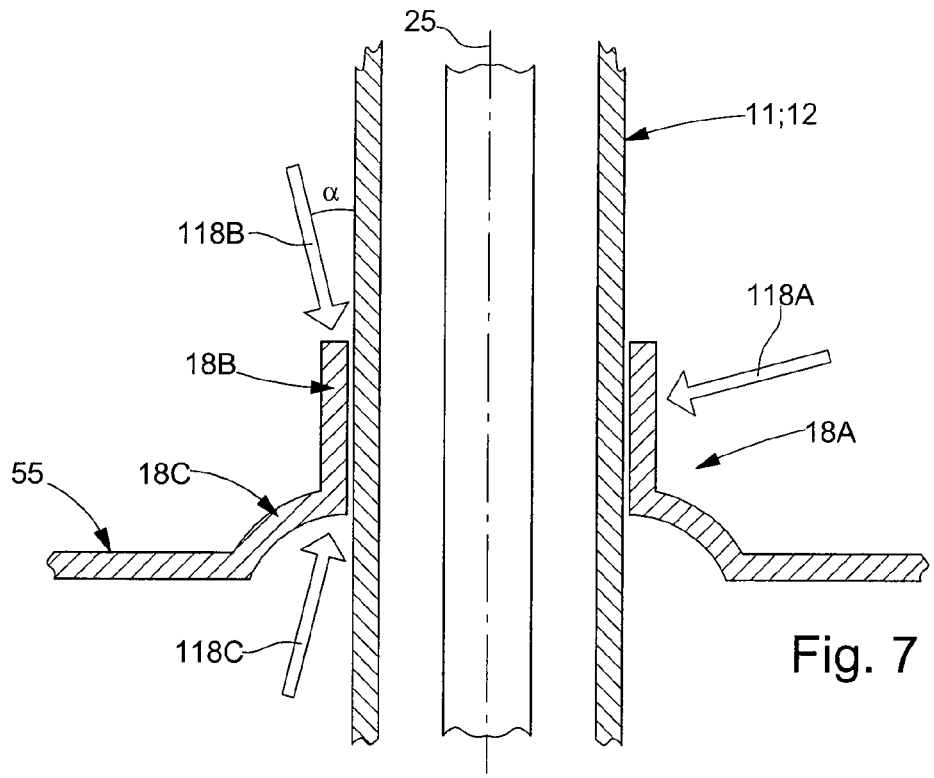
FIG. 7 is a partial enlargement of FIG. 6 showing the arrangement of the chamber at the passage of the heating element.

FIG. 7 schematically shows the area of the upper section 55 of the generator of FIG. 6 where an opening is provided for the heating element to pass through. The opening is defined by a flange 18A that protrudes out of the main plane surface of the upper section 55. In this variant, the flange 18A has a curved lower section 18C with a cylindrical section 18B on top, the wall of which is parallel to the direction of insertion 25 of the end section 11, 12 of the heating element. This cylindrical section defines a guide for the end section 11, 12 inserted into the flange. This allows an increase in the rigidity of the fastening of the heating element to the chamber.

This FIG. 7 shows laser beams 118A, 118B and 118C representing three possibilities of laser welding for the end section 11, 12 to the flange 18A. The beam 118B incident at an angle $\alpha$ from the axis 25 allows the formation of a weld essentially in the angle formed by the end section 11, 12 and the upper annular surface of the flange 18A. Preferably, the angle $\alpha$ has a value of between 10° and 45°. Because of the flange, which extends out of the main surface of the cover 55 perpendicular to this main surface, the flange provides a reservoir of material to form a weld and in particular to fill any slot between the flange and the end section that passes through it. In this way, embrittlement of the laser welding zone as a result of a lack of material is prevented. The flange can be melted and also deformed without generating any thermal or mechanical stresses for the wall of the chamber. Then, because the flange forms a reservoir of material, the wall thereof can remain thin just like the wall of the chamber in the area of the flange. This allows the chamber to be produced at low cost with a thin wall overall. Moreover, a thin flange allows the amount of heat for welding to be reduced to better absorb the thermal stresses of this laser welding and thus to prevent the cover or wall of the chamber from deforming in the welding area. Therefore, this flange allows laser welding to be conducted effectively to assure a favorable tightness and favorable rigidity of the fixture of the heating element to the chamber because of a thick and continuous weld.

FIG. 7 also shows a laser beam 118A provided as an alternative to welding with laser beam 118B or another complementary welding that is conducted across the cylindrical section 18B. Finally, it is also possible to provide an internal weld by means of laser beam 118 C in order to close the internal slot between this cylindrical section and the end section 11, 12 of the heating element by a weld. The internal welding is advantageously provided in addition to welding with laser beam 118A or 118B, but can also be conducted alone.

Figure 2:
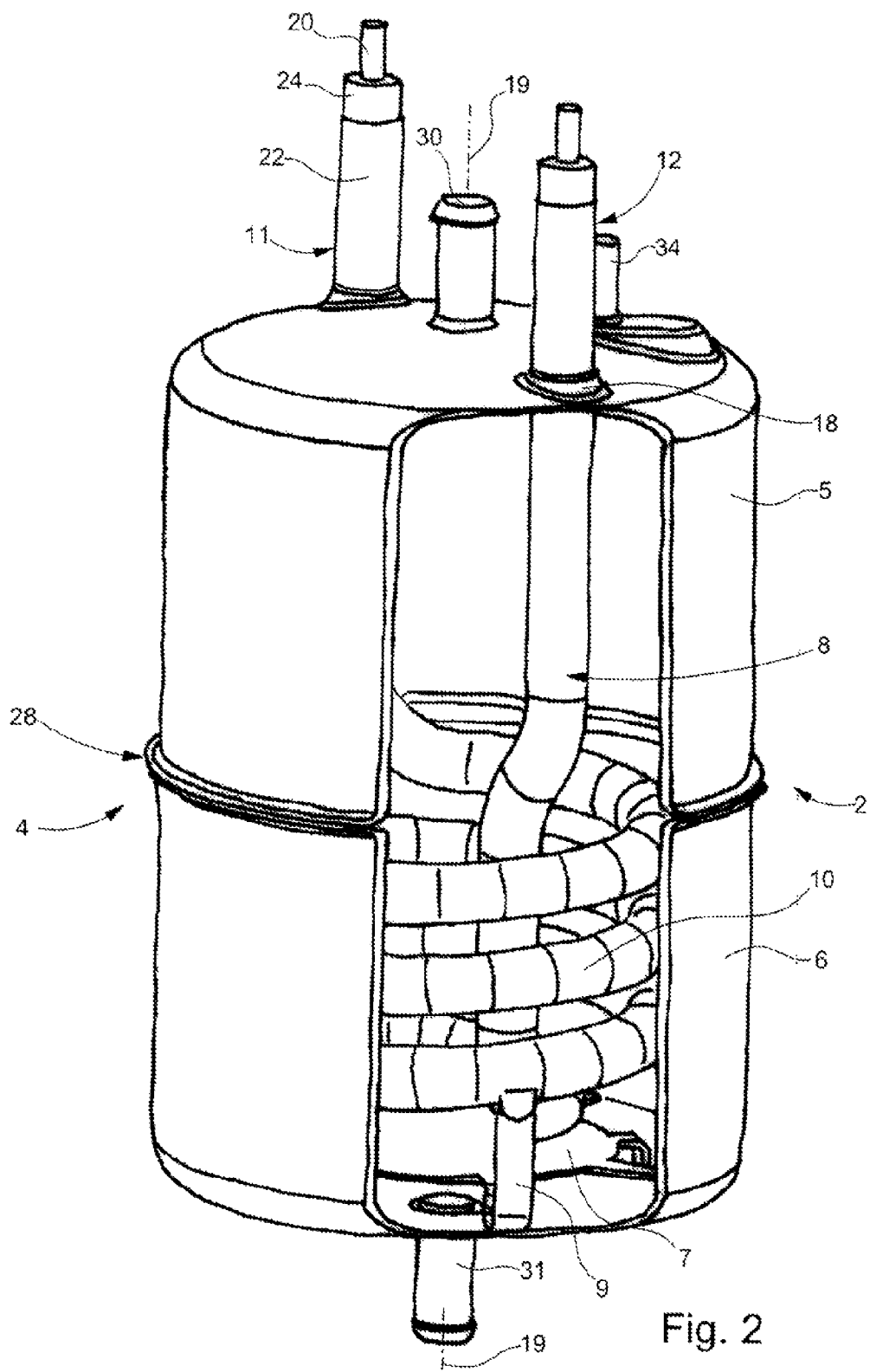
FIG. 2 is a perspective view of the water heater of FIG. 1 after closure of the chamber, in which a portion of this chamber is cut away.
Figure 8:
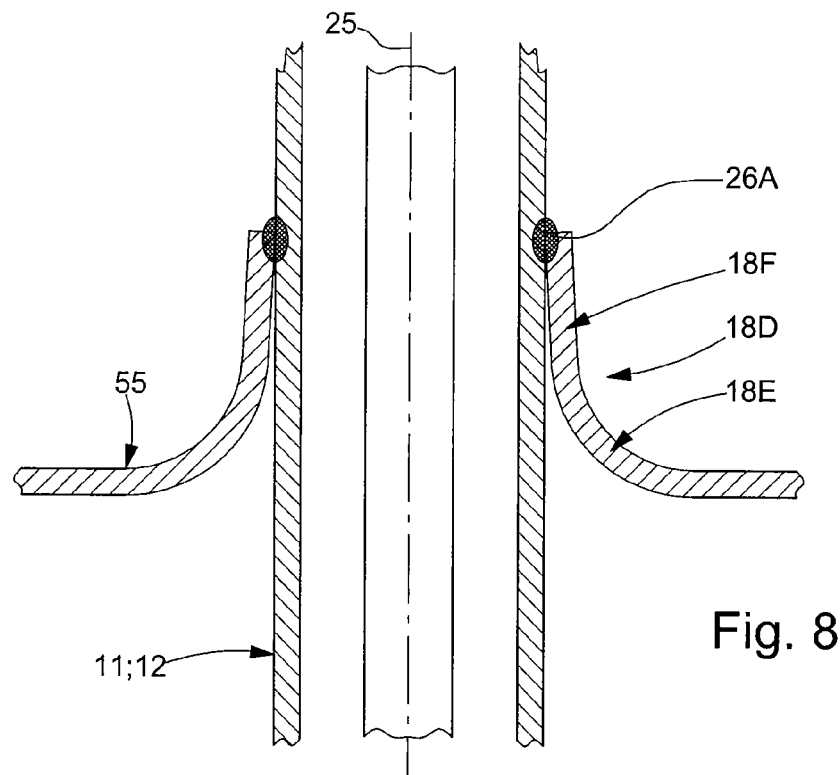
FIGS. 8 and 9 respectively show two variants of the flange surrounding the passage of the heating element.

FIG. 8 shows a variant of the flange similar to that of the water heater of FIG. 2. The flange 18D has a base 18E with a shape widening towards the inside of the chamber and an upper section 18F with a slightly truncated cone shape and an almost cylindrical shape. The shape of this upper section 18F enables the machining tolerances of the opening to be reduced since the end section 11, 12 is inserted into the flange from the widened lower section 18E. The flange 18D thus guides the end section that can lightly spread the top of the upper section, if necessary, in order to avoid the presence of a slot before the laser welding, which will then preferably be conducted at the level of the top of the section 18F in order to form a weld 26A, as shown schematically in FIG. 8.

Figure 9:
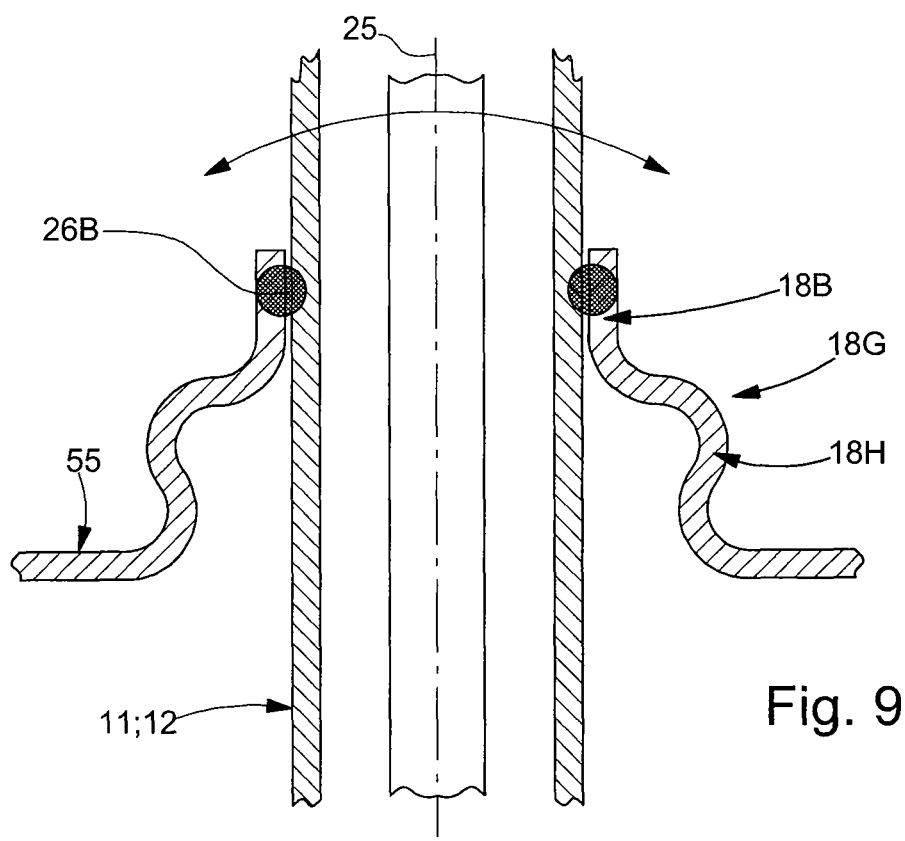

FIG. 9 shows another variant of the flange according to the invention. This flange 18G comprises a lower section 18H with some elasticity, which allows some degree of deformation of the flange to incline the axis 25 defining the direction of insertion of the end section 11, 12 of the heating element. In this way, the orientation of the heating element can be varied to ensure correct positioning of this heating element in the chamber of the water heater or steam generator. Moreover, this feature can be advantageous when the heating element has two end sections 11 and 12, as in the embodiments described above, and when the initial spread (before assembly) of these two end sections does not correspond exactly to the distance between the two corresponding openings in the wall of the chamber. To enable laser welding to be conducted, the flange 18G has a cylindrical upper section 18B. This FIG. 9 shows a weld 26B between the section 18B and the end section 11, 12 that is obtained by means of a laser beam oriented in a similar manner to the laser beam 118A in FIG. 7. It is evident that the upper section of the flange 18G can be truncated cone-shaped, as shown in FIG. 8 described above.

It is noted that the shown flanges are in one piece with the body of the chamber and are formed in particular by stamping. However, this is not restrictive and in other variants the flange can be configured in the form of a piece mounted on the body of the chamber.

A laser welding assembly according to the invention will now be explained on the basis of FIGS. 10 and 11 that has been developed to perform the welding of the heating element and the connector fittings or elements of the circuit of water/steam associated with the water heater or steam generator according to the invention.

The assembly comprises a laser source (not shown) that preferably supplies a pulsed laser beam. The laser beam is directed by an optical fiber 70 to a welding device 72 comprising a fixed upper section 74 connected to the optical fiber. The laser beam 76 is collimated by collimation means 78. The welding device 72 comprises a rotary head 80, i.e. that is mounted so that it can be set in rotation around a geometric axis 82. The device 72 has various optical elements defining an optical path 84 for the laser beam 76. A first mirror 86 is arranged to deflect the laser beam 76 so that the optical path downstream of this mirror 86 merges with the axis of rotation 82. As it propagates along this axis 82, the laser beam 76 enters the rotary welding head 80 where it is deflected by a second mirror 88 in a direction perpendicular to the geometric axis 82. This mirror 88 is arranged in a first section 90 of the head 80. This section 90 is set in rotation by schematically shown drive means 94. These drive means 94 are coupled to a rotary module 96 arranged to set the section 90 in rotation. Therefore, means for coupling this section 90 and the rotary module 96 in rotation are provided.

Means 100 for transferring a work gas between the fixed section 74 and the rotary head 80 are arranged below the module 96. These means shall be described in more detail below on the basis of FIG. 11. The rotary head 80 additionally comprises a section 102 having a mirror 104 that deflects the laser beam 76 coming from mirror 88 along an optical axis running obliquely relative to the geometric axis 82 and oriented in the direction of this axis 82 in the direction of propagation of the laser beam. In its end region section 102 has a nozzle 106, through which the laser beam 76 and the work gas exit. This work gas is directed to the level of the nozzle 106 by means of a conduit 108. Finally, focusing means 110 are arranged in section 102.

Sections 90 and 102 of the head 80 comprise complementary means 105 (shown schematically) that allow the section 102 to displace or slide in relation to section 90 in the direction perpendicular to the axis 82. The position of section 102 is adjusted as a function of the diameter of the part to be welded. Once this position has been determined, section 102 is firmly held on section 90. Therefore, these are means for controlling the radius of the circle defined by the focal point when the head 80 is set in rotation. When the device 72 is in operation, sections 90 and 102 remain integral to one another.

Figure 3:
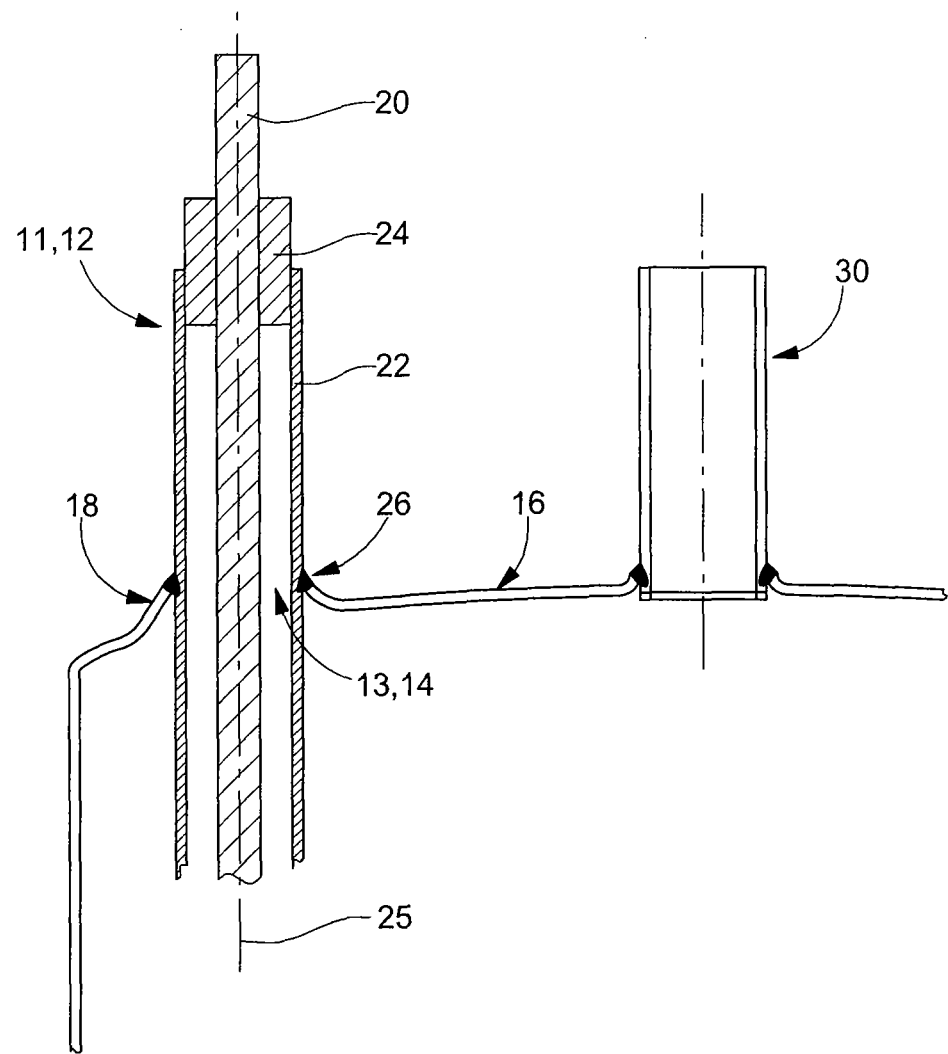
FIG. 3 is a sectional view of an end of a heating element welded to the chamber of the water heater of FIG. 2.

For welding the ends 11 and 12 of the heating element of the water heater 2 described in FIGS. 1 to 3, the optical axis 112 is arranged so that the angle formed between this axis 112 and the axis of rotation 82 is equal to about 20°. This angle of appreciably less than 45° has been provided in particular because of the presence of the fitting 30. Thus, it is possible using the device 72 to weld the end section 11 and 12 respectively to the chamber 2 by means of a focused laser beam and a work gas brought close to the formed weld. In fact, the particular arrangement of the head 80 allows the nozzle 106 to be brought close to the welding zone, this nozzle rotating around section 11 and 12 respectively of the heating element during the laser welding.

It will be noted that when the rotary head 80 is set in rotation, the axis 112 defines a conical rotation surface and the focal point defines a circle centered on the axis of rotation 82. Thus, to perform the laser welding the central axis 25 of the end section 11 and 12 respectively is aligned to the axis of rotation 82. Focusing means 102 are arranged and adjusted so that the focal point is essentially located in the zone of the edge of the hole of the chamber 2, through which the end section 11 and 12 respectively of the heating element passes. In this way, a precise and quick welding of the heating element to the chamber is achieved.

The focal point is located along the optical axis 112 before this optical axis intersects with the axis of rotation 82. The laser beam thus defines a truncated cone-shaped rotation surface after having been reflected by the mirror 104 when the head 80 is set in rotation. As the focal point defines a circle when the head 80 rotates, a continuous circular weld is obtained by controlling the rotational speed in relation to the frequency of pulses of the laser beam so that a favorable tightness is thus assured.

FIG. 11 schematically shows a more detailed view of the device 100 for transferring the work gas between the fixed section 74 and the rotary head 80 of the welding device 72. The device 100 comprises an external cylindrical ring or section 120 that is integral to the fixed section 74. On its periphery the ring 120 has means 124 for connection to a gas feed pipe 122. Behind the connection means, the ring has a passage 126. The main section 130 of the device 100 has a central opening 132 for passage of the laser beam and a recess 134 on its periphery. This recess 134 is circular and opens onto the outside side wall of the section 130. The opening 126 in the ring 120 is arranged relative to the recess 134 in such a way that it is essentially aligned with this, i.e. in order to open into this recess. A vertical opening 138 then links the recess 134 to the means 140 for connecting to the pipe 106, this bringing the work gas to the level of the nozzle 106.

The main section 130 is rotationally integrated to the welding head 80. Sealing means are evidently provided between the ring 120 and the section 130 so that, whatever the angular position of the welding head, the gas entering the recess 134 is forced to discharge from this recess 134 through conduit 138 in the direction of the nozzle of the welding head.

The machining assembly described above thus allows a circular weld to be performed precisely around a heating element as well as a work gas to be supplied in a localised manner and under pressure to carefully perform this laser welding.

Figure 12:
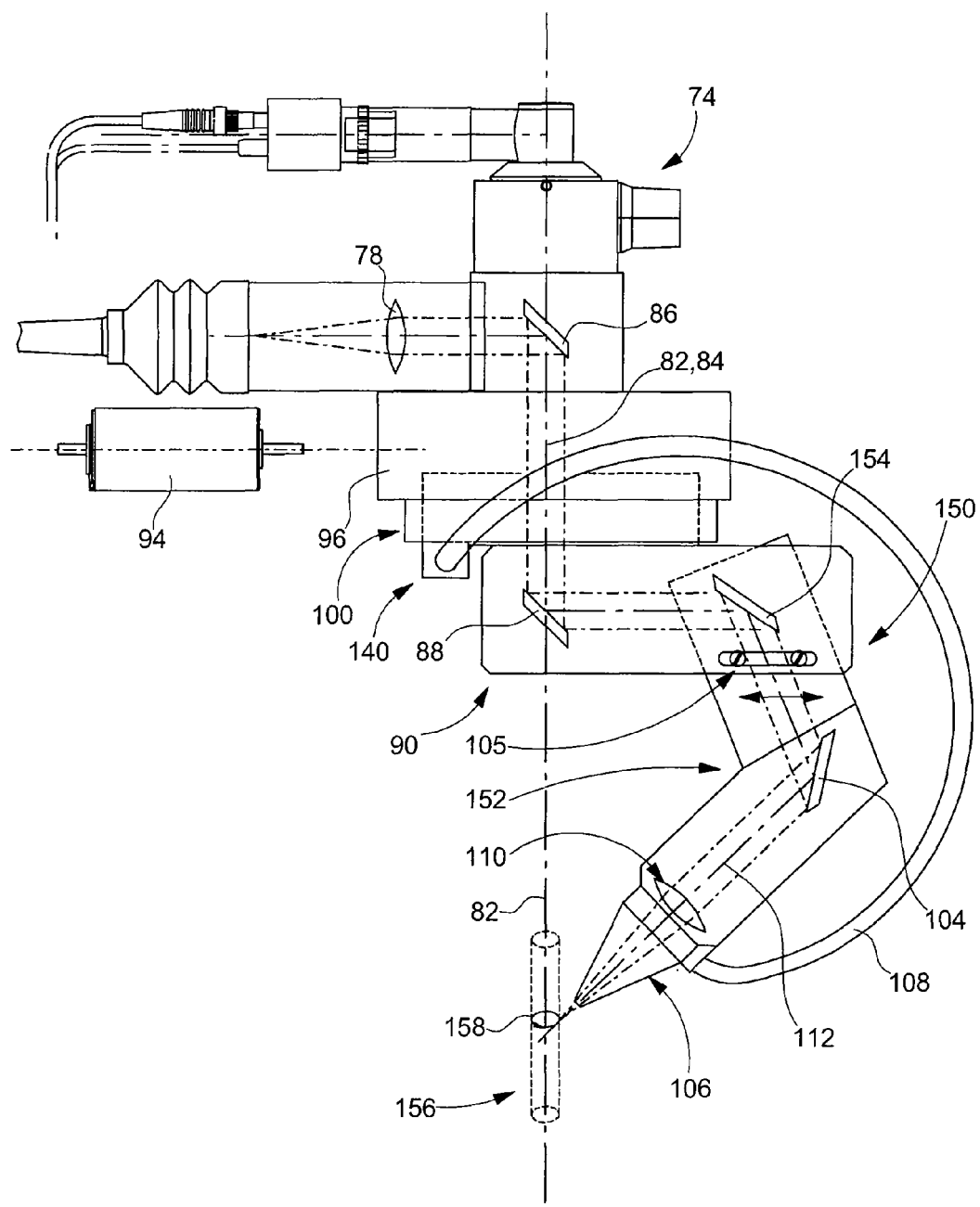
FIG. 12 shows a second embodiment of a laser welding assembly according to the invention.
Figure 13:
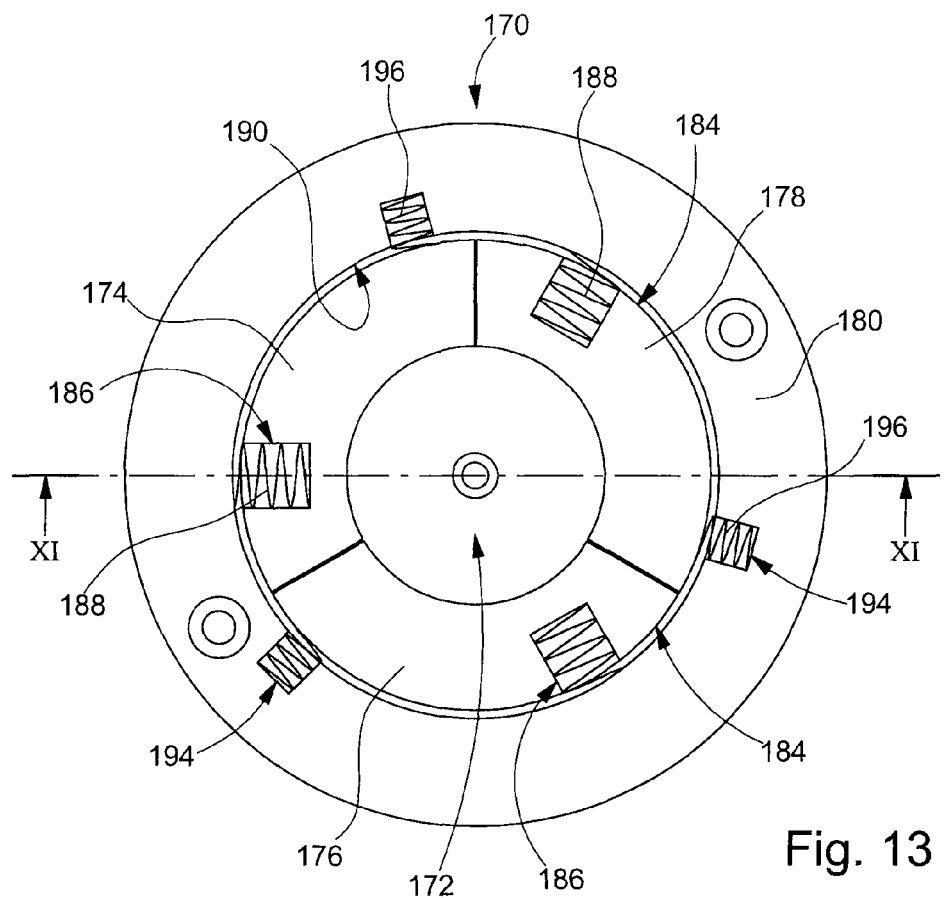
FIG. 13 is a view in horizontal section of a positioning tool of the heating element of the water heater of FIG. 1 for welding this heating element to the chamber of the water heater.
Figure 14:
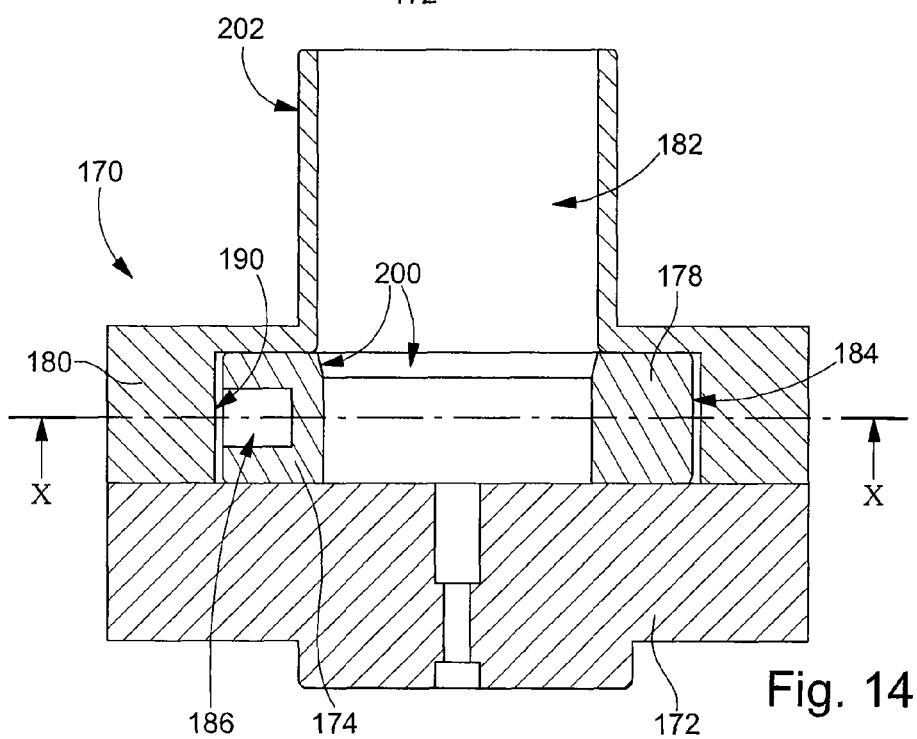
FIG. 14 is a view in vertical section of the tool of FIG. 10 taken along the cutting plane XI-XI.

FIG. 12 shows a second embodiment of a laser welding assembly according to the invention. Those elements that have already been described above will not be described here again in detail. This second embodiment differs from the first embodiment essentially in the arrangement of the lower section 152 of the rotary welding head 150. The upper section 90 of the head 150 is similar to that of the head 80 described in association with the first embodiment. The lower section 152 is mounted on the section 90 in order to allow its position to be adjusted in a direction perpendicular to the axis of rotation 82. A first mirror 154 that deflects the laser beam at an angle less than 90°, in particular an angle of 67.5°, is arranged in this section 152. In its intermediate region the section 152 has a bend where another mirror 104 is arranged that deflects the optical path of the laser beam likewise at an angle of 67.5°. Thus, the optical axis 112 of the laser beam downstream of the mirror 104 has an angle of 45° in relation to the axis of rotation 82. Such an arrangement allows a cylindrical space 156 to section 90 to be left free, the space having as cross-section the circle 158 defined by the focal point of the laser beam when the head 150 is set in rotation.

The second embodiment is advantageous because the optical axis has an angular opening of about 45° in relation to the axis of rotation without requiring any extension of the upper section 90 of this head. Therefore, the head is compact and the rotation moment of inertia is lower than that of a head of the type of the first embodiment, which would be arranged so as to have an opening of 45° between axis 82 and axis 112. The radius of the circle 158 can easily be adjusted by adjusting the position of section 152 in relation to section 90 in a direction perpendicular to the axis of rotation 82. Such an adjustment is simple since it does not cause any modification in the orientation of the various mirrors provided.

In sum, then, the present invention pertains broadly to a water heater (2) or steam generator that includes a chamber (4) in two sections (5, 6) formed, in particular, by stamping. Inside this chamber a heating element (8) is arranged, which has a spiral-shaped main section (10) and two end sections (11, 12) passing through two circular openings of the chamber. The two end sections are welded to the chamber by a laser beam such that the weld obtained is continuous and ensures a good mechanical fixture of the heating element and an adequate tightness for the water heater or steam generator. For this purpose, a flange (18) is arranged at the periphery of each opening. Moreover, the two sections of the chamber have a widened edge (28) to allow them to be welded effectively.

The invention claimed is:

1. A method of manufacturing a water heater or a steam generator, the method comprising the steps of:
   (a) providing a chamber comprising
      i. a flange arranged at a periphery of an opening provided in a wall of the chamber; and
      ii. a heating element comprising a main section located inside the chamber and at least one end section exiting from the chamber, wherein the flange protrudes out of a main surface of the wall of the chamber in an axial direction of the at least one end section at the level of the opening;
   (b) inserting the at least one end section of the heating element through the opening of the chamber;
   (c) providing a laser beam source;
   (d) orienting a laser beam from the laser beam source, obliquely in relation to the axial direction of the end section, at a top of the flange; and
   (e) laser welding the top of the flange to the at least one end section of the heating element to form laser welds that tightly secure the heating element to the chamber.

2. The method according to claim 1, further comprising the step of:
   (f) directing the laser beam essentially onto an upper annular surface of the flange to laser weld the at least one end section to the flange essentially in a corner defined by the upper annular surface and the at least one end section.

3. The method according to claim 2, further comprising the step of:
   (g) arranging the laser beam and the axial direction at an angle between 10 degrees and 45 degrees.

4. The method according to claim 2, further comprising the step of:
   (g) arranging the flange to widen towards an interior of the chamber.

5. The method according to claim 1, further comprising the step of:
   (f) arranging the flange to have a section having a wall parallel to the axial direction of the at least one end section and defining a guide for the at least one end section.

6. The method according to claim 1, further comprising the step of:
   (f) forming the flange so that the flange has an elasticity, or deformability, or both an elasticity and a deformability, sufficient to allow variation in the axial direction of the at least one end section at the level of the flange.

7. The method according to claim 1, further comprising the step of:
   (f) forming the chamber of stainless steel.

8. The method according to claim 1, wherein the laser welding is performed with a series of pulses and generates a series of laser weld points partially superposed one on top of the other.

9. The method according to claim 8, wherein each laser pulse is arranged to have a power profile with a first power over a first period, arranging the first power to be higher than a second power, generating the second power over a second period following the first period, and controlling the second power to decrease over the second period.

* * * * *